United States Patent [19]
Davis

[11] Patent Number: 4,668,498
[45] Date of Patent: May 26, 1987

[54] SUPERSONIC SINGLET DELTA OXYGEN AEROSOL GENERATOR

[76] Inventor: James A. Davis, 954 Emerson St., Thousand Oaks, Calif. 91362

[21] Appl. No.: 781,278

[22] Filed: Sep. 27, 1985

[51] Int. Cl.$^4$ ............................................. C01B 13/00
[52] U.S. Cl. ................................... 423/579; 372/89; 422/128; 422/224
[58] Field of Search ........................................ 423/579

[56] References Cited

U.S. PATENT DOCUMENTS

| | | | |
|---|---|---|---|
| 3,917,811 | 11/1975 | Grout et al. | 423/659 |
| 3,944,401 | 3/1976 | Dorr et al. | 55/73 |
| 4,246,252 | 1/1981 | McDermott et al. | 423/579 |
| 4,310,502 | 1/1982 | Wagner | 423/579 |
| 4,342,116 | 7/1982 | MacKnight et al. | 372/89 |
| 4,461,756 | 7/1984 | Rockenfeller | 423/579 |
| 4,558,451 | 12/1985 | McDermott et al. | 423/579 |

OTHER PUBLICATIONS

Benard, D. J., McDermott, W. E., Pchelkin, N. R., Bousek, R. R., "Efficient Operation of a 100-W Transverse-Flow Oxygen-Iodine Chemical Laser", *Appl. Phys. Lett.* 34(1), 1 Jan. 1979, pp. 40–41.

*Primary Examiner*—John Doll
*Assistant Examiner*—Wayne A. Langel

[57] ABSTRACT

A singlet delta aerosol generator 10 includes a reaction chamber 24 downstream from a supersonic nozzle section 18. A mixture of gaseous chlorine and an inert diluent gas is reacted with liquid basic hydrogen peroxide (BHP) in reaction chamber 24 to form a flow of liquid droplets and gaseous singlet delta oxygen. Separating means, including a deflecting body 30, located within a downstream end of the reaction chamber 24, separates the flow of liquid droplets and gaseous singlet delta oxygen into a primary flow and a secondary flow. The primary flow contains a major amount of the gaseous singlet delta oxygen and a minor amount of the liquid droplets; the secondary flow contains the remainder of the gaseous singlet delta oxygen and of liquid droplets.

12 Claims, 2 Drawing Figures

SUPERSONIC SINGLET DELTA OXYGEN AEROSOL GENERATOR

BACKGROUND OF THE INVENTION

1. Field of the Invention

The present invention relates to chemical iodine lasers, and more particularly to a supersonic aerosol singlet delta oxygen generator for an oxygen/iodine laser.

2. Prior Art

Chemical lasers induce a lasing action by mixing an optically active lasing medium with an electronically excited energizing gas and then directing a flow of the resultant gaseous mixture into an optical laser cavity where the lasing action is generated. The lasing medium and the electronically excited gas react chemically to provide the necessary population inversion and lifetime required to create the lasing action.

An oxygen/iodine laser system utilizes iodine as the optically active medium and singlet delta oxygen, $O_2(^1\Delta)$, as the excited energizing gas.

Singlet delta oxygen is generated on contact of $Cl_2$ gas with an aqueous solution of basic $H_2O_2$ (hypochlorite $H_2O_2$ reaction) in accordance with the equation $$Cl_2 + H_2O_2 + 2NaOH \rightarrow O_2(^1\Delta) + 2NaCl + 2H_2O.$$

However, the excited oxygen can be reduced to its unusable ground state, $O_2(^3\Sigma)$, by metal contact quenching, wall quenching, gas phase quenching, and liquid phase quenching. Therefore, to generate $O_2(^2\Delta)$ both efficiently and in high yield, the contacting device (reactor) for the gaseous and liquid reactants must provide a large interfacial area in a small volume for a short time, followed by rapid separation of the gaseous and liquid phases.

Several different processes have been developed for $O_2(^1\Delta)$ generation. One of these processes, a sparger process, entails bubbling gaseous chlorine through a pre-mixed liquid bath of basic hydrogen peroxide (BHP). Although $O_2(^1\Delta)$ is generated, it is limited to relatively low pressures (partial pressure of oxygen less than about 20 torr). Also, the $O_2(^1\Delta)$ yield of systems using such sparger generators has typically been less than 50% (ratio of $O_2(^1\Delta)$ to total oxygen flow) at oxygen partial pressures between 10 and 20 torr. These low yields and low oxygen partial pressures are due primarily to the problems involved in separating the liquid and gaseous phases following the BHP reaction. The sparger operation (chlorine bubbling-type systems) produces a foam on top of the liquid bath. In order to prevent the foam from being carried over in large quantities into other parts of the system, the superficial gas velocity must be kept low—typically below 600 cm/sec. This low speed gas flow leads to a longer residence time, i.e., the time between $O_2(^1\Delta)$ generation and the time the $O_2(^1\Delta)$ is utilized in the laser cavity. Longer residence times (on the order of 50 msec) cause large losses through $O_2(^1\Delta)$ quenching processes.

U.S. Pat. No. 4,246,252, issued to MacDermott et al, discloses a sparger system. In the MacDermott et al system a cold finger (vapor cold trap) is utilized to remove excess water vapor evolved as the BHP liquid is heated, either by the reaction producing $O_2(^1\Delta)$ or by subsequent deactivation of some of the $O_2(^1\Delta)$ molecules in the gas or on catalytic surfaces (such as the vessel walls on the liquid contact surfaces). Furthermore, the gas is separated from the liquid phase primarily by gravity pulling the liquid froth and droplets back into the BHP bath. Therefore, the gas velocity is limited to relatively low speeds to prevent entrainment of a significant amount of liquid BHP as aerosol droplets within the outflowing gas stream.

As a result of the relatively low gas velocity and the added flow path required by utilizing the cold finger, the residence time is typically on the order of 10–100 msec. Significant loss of $O_2(^1\Delta)$ energy occurs due to quenching of the excited molecular species in that relatively long residence time.

Another process developed for $O_2(^1\Delta)$ generation entails use of a wetted wall reactor. A liquid film of BHP flows down the surfaces of the reactor, i.e., a Kinecs mixer, during the reaction with chlorine. Deficiencies in this process include the need for a vapor cold trap for vapor condensation and resulting increased residence time. Furthermore, this process depends on gravitational body forces to drain the BHP through the reaction zone and into a collection sump.

Another process developed for $O_2(^1\Delta)$ generation involves using an aerosol generator. This technique involves impingement of a jet of liquid BHP on a jet of chlorine gas to produce a fine spray (aerosol) of liquid BHP droplets. The droplets are surrounded by the chlorine gas and react to produce $O_2(^1\Delta)$.

U.S. Pat. No. 4,342,116, issued to MacKnight et al, involves using an aerosol generator in combination with a centrifugal separator and a freezing section (vapor cold trap). This technique does not involve liquid handling techniques, which require gravitational feed and separation. After the droplets react to produce $O_2(^1\Delta)$, the stream is passed through the centrifugal separator which separates the liquid drops by generating a swirl in the flow. This swirl causes the drops to be thrown radially outwardly thus impinging and collecting on the outer walls of the separator. The separated liquid is then drained away. The remaining vapor and liquid drops are frozen on the walls and fins of the freezing section, and a dry flow of $O_2(^1\Delta)$ is generated. The relatively low flow conditions and required freezing section in this process reduces the effective $O_2(^1\Delta)$ yield.

OBJECTS OF THE INVENTION

A primary object of the present invention, therefore, is to provide a singlet delta oxygen generator capable of producing usable singlet delta oxygen in high concentrations.

Another object of the present invention is to minimize quenching of singlet delta oxygen in an oxygen generator.

Still another object of this invention is to provide a simple, dependable, efficient and economical method for preparing singlet delta oxygen for use as an energizing medium for an oxygen/iodine laser.

Still another object of the present invention is to reduce the pressure and temperature ordinarily present during the chemical reaction for forming singlet delta oxygen to minimize the evolution of water vapor.

Other objects, advantages and novel features of the present invention will become apparent from the following detailed description of the invention when considered in conjunction with the accompanying drawing.

SUMMARY OF THE INVENTION

The present invention provides an apparatus and method for generating singlet delta oxygen for a chemical laser system. In its broadest aspects, the singlet delta oxygen generator comprises a reaction chamber for reacting gaseous chlorine with liquid basic hydrogen peroxide (BHP) under supersonic flow conditions. The reaction results in a flow of liquid droplets and gaseous singlet delta oxygen. Separating means located within a downstream end of the reaction chamber separates the flow of liquid droplets and gaseous singlet delta oxygen into a primary flow and a secondary flow, the primary flow containing a major amount of the gaseous singlet delta oxygen and a minor amount of the liquid droplets, the secondary flow containing the remainder of the gaseous singlet delta oxygen and of the liquid droplets.

DETAILED DESCRIPTION OF THE INVENTION

Figure 1:
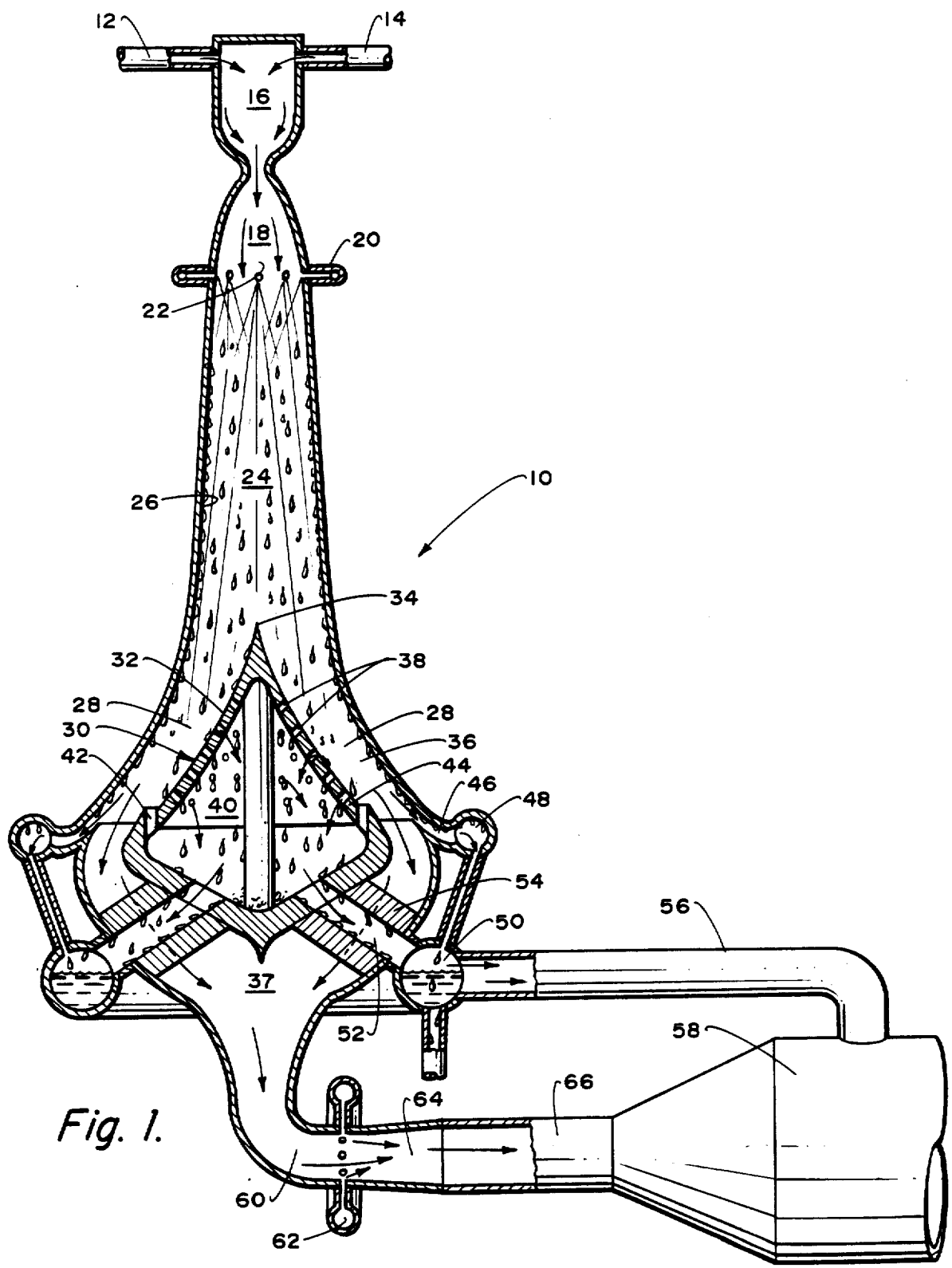
FIG. 1 is a schematic representation partially in cross section of a first embodiment of the supersonic singlet delta oxygen generator of the present invention.

In FIG. 1 is shown a schematic representation of a supersonic generator 10 for providing a singlet delta oxygen aerosol. Chlorine gas and, optionally and preferably, an inert gas such as argon, nitrogen or helium are injected through inlets 12 and 14 are relatively high pressures into a nozzle plenum chamber 16. The resulting gas mixture is accelerated in a supersonic nozzle section 18 of the generator 10. Use of an inert gas as a diluent is not essential for this generator; however, the inert gas helps to control and maintain supersonic flows by providing extra thermal mass for moderating gas stream temperatures. Liquid jets of basic hydrogen peroxide (BHP) are injected through an inlet 20 into the gas stream at a downstream end 22 of the supersonic nozzle section 18.

The BHP is quickly atomized into a fine aerosol spray in a reaction chamber 24 downstream from the supersonic nozzle section 18. This fine BHP spray reacts with the chlorine to provide excited $O_2(^1\Delta)$ as the spray travels through the reaction chamber. The low temperature of this expanded flow results in a reduced water vapor pressure.

Although the reaction chamber 24 is shown as having a circular cross section and diverging walls, neither of these features, while preferred, is essential. It is desired that an inner surface of a wall 26 of the reaction chamber 24 to be coated with an inert substance such as Teflon or glass to minimize wall quenching of the excited oxygen. Using these inert organic or inorganic substances significantly reduces the transfer of energy from $O_2(^1\Delta)$ to the wall 26 should the $O_2(^1\Delta)$ contact the wall 26 thereby helping to prevent the generation of unusable ground state oxygen. Preferably, the rate of divergence of the reaction chamber 24 increases at its downstream end 28. Following the production of $O_2(^1\Delta)$, the supersonic gases are turned or diverted through a series of oblique shock waves generated by a deflecting body 30 located within the downstream end of the reaction chamber 24. The oblique shock waves turn the supersonic gas stream, causing a deceleration of the gas stream and an increase in the gas stream temperature and pressure.

In FIG. 1 the deflecting body 30 is shown coaxially positioned along the central axis of the reaction chamber 24. In this embodiment deflecting body 30 is hollow and has a deflecting surface 32 which is cone-shaped with an apex 34 facing the upstream direction. Most of the gaseous singlet delta oxygen flows through an annular space 36 between the wall 26 of the reaction chamber 24 and the deflecting body 30. This flow, hereinafter referred to as the primary flow, has its velocity reduced to a subsonic level and is directed to a tapered laser nozzle plenum 37. The liquid droplets are not as easily directed due to the their having a greater inertia than the gas, and they therefore impinge on deflecting surface 32. Most of the liquid that impinges on this upstream deflecting surface 32 then flows through perforations 38 on the surface into a hollow chamber 40 within deflecting body 30. Any residual liquid films flowing along the deflecting surface 32 is collected by a scoop 42 just downstream of a base 44 of the surface 32. A second scoop 46, along the circumference of the reaction chamber wall, at a region of increased divergence, collects a liquid film flowing down from the inner surface of wall 26 of the reaction chamber. This liquid BHP film, as well as some gas collected by scoop 46, are ducted through a collection manifold 48, and the liquid is allowed to settle in a bypass gas/liquid separator 50.

Some gas is also admitted through the perforations 38 within deflecting surface 32 and through scoop 42. The gas/liquid mixture in the hollow chamber 40 is directed through drainage passages 52 inside deflecting body support struts 54. The liquid in this mixture is also allowed to settle in the gas/liquid separator 50. This secondary gas/liquid flow, comprised of the flow through the drainage passages 52 and the flow through the collection manifold 48, contains gas and liquid which is essentially all quenched. The gas in gas/liquid separator 50 is aspirated through a gas bypass line 56 (or may be pumped by gas dynamic or mechanical means) into a reduced pressure laser exhaust plenum 58.

The primary flow stream, containing $O_2(^1\Delta)$ which has been directed to laser nozzle plenum 37, is left relatively free of aerosol particles, i.e. liquid droplets of BHP. This flow is mixed in a laser nozzle 60 with a gas stream containing gaseous iodine or iodine-bearing compounds supplied through a supply manifold 62. The subsequent chemical reactions and energy transfer processes provide excited molecular or atomic species for producing photons in a laser optical cavity 64. Gases leaving the optical cavity 64 pass through diffuser sections 66 and rejoin the gas bypass flow in the laser exhaust plenum 58 at low pressures.

The arrangement shown in FIG. 1 allows the singlet delta oxygen generator to operate at low temperature and pressure during the reactions of $Cl_2$ and BHP while providing a relatively high pressure primary flow stream to the laser nozzle. The reduced gas residence time in both the reaction chamber 24 and the gas/liquid separator 50 leads to reduced singlet delta oxygen quenching. The low gas temperature (and correspondingly low water vapor pressure) as a result of supersonic flow conditions eliminates the need for an additional freezing section or cold trap. Furthermore, there is no reliance in the present invention on gravitational forces for the generator to function properly. The power flux through the laser nozzle is also improved by the higher $O_2(^1\Delta)$ yields and greater stagnation pressures available from the supersonic aerosol generator.

FIG. 1 illustrates an embodiment of a singlet delta oxygen generator with a deflecting body sufficient to reduce the primary flow velocity to a subsonic level.

However, other generator embodiments are contemplated which allow supersonic flow conditions to be maintained throughout the process. Such another embodiment is illustrated in FIG. 2, similar numerals being used for corresponding parts.

Figure 2:
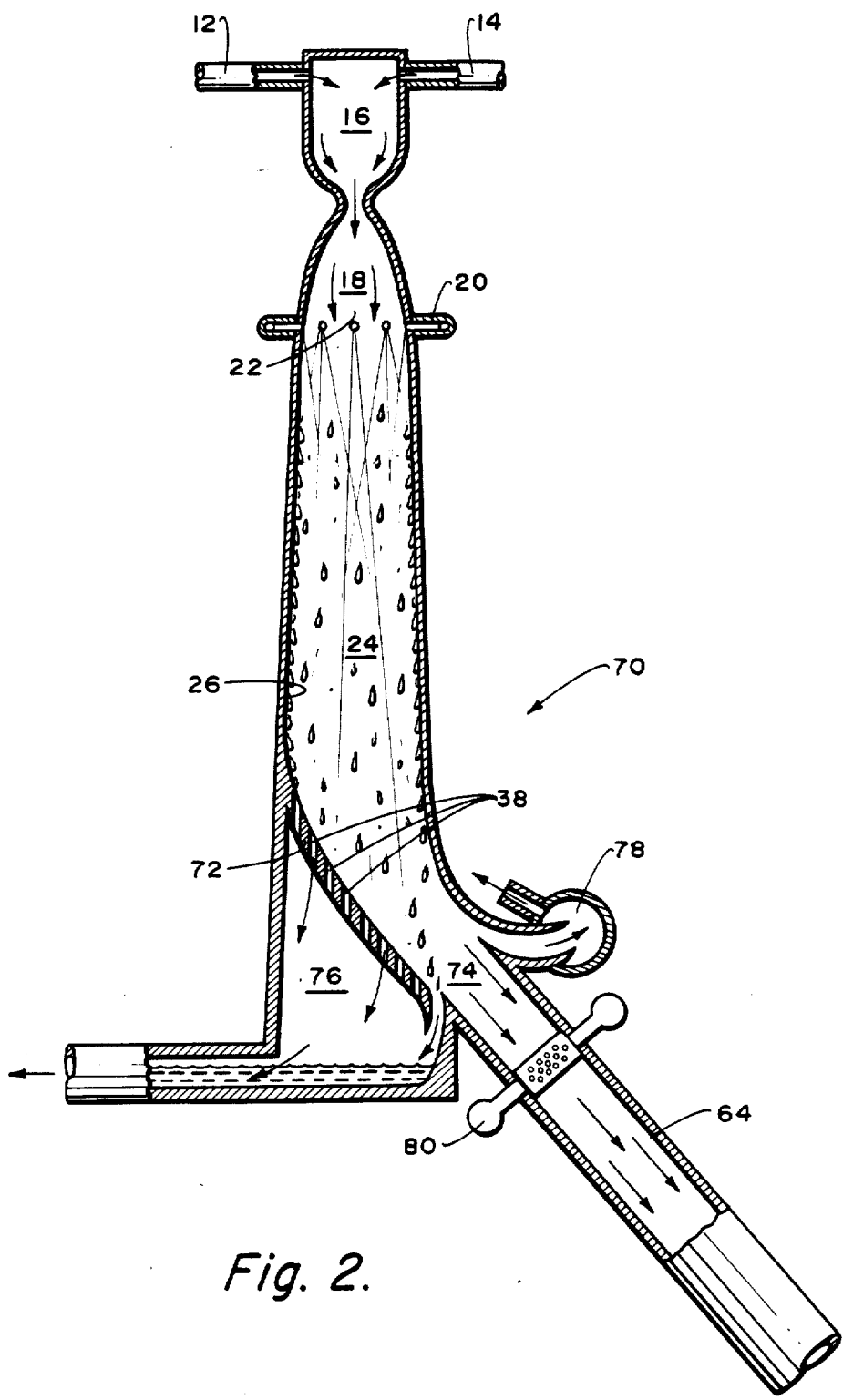
FIG. 2 represents a second embodiment of a supersonic singlet delta oxygen generator.

FIG. 2 shows a generator 70 with an inclined deflecting surface 72 extending from an inner surface of the wall 26. As in the previous generator embodiment, most of the gas, a primary flow, is diverted and flows through a conduit space 74 toward the optical cavity 64. The liquid droplets, however, are unable to turn and impinge on deflecting surface 72 or form a liquid film on the inner surface of wall 26. The liquid which impinges on the deflecting surface 72 is collected in a chamber 76, and the liquid from the wall 26 flows into a scoop 78. The combined liquid streams, along with some gas, which, as in FIG. 1, form a secondary flow, recombine with the primary flow at the laser exhaust (not shown).

In the FIG. 2 embodiment the primary flow is not diverted to the same extent as in the FIG. 1 embodiment, and supersonic conditions are thereby maintained throughout the process. This results in a higher $O_2(^1\Delta)$ yield; however, the partial pressure of the $O_2(^1\Delta)$ is reduced. Thin, wedge-type injectors 80 for injection of iodine should be used to prevent the generation of strong shockwaves within the flow.

By way of example, but not limitation, the following operating parameters are given for the embodiment shown.

EXAMPLE

A molar mixture of approximately 10 parts helium (an inert gas used as a diluent) to 1 part chlorine is injected at pressures of greater than or equal to 20 atmospheres. The partial pressure of the chlorine should be less than 2 atmospheres and the gas temperature near ambient, i.e., about 300° K.

A supersonic nozzle is utilized with an exit to throat area ratio of 6:1 or greater. With a nozzle ratio of 6:1 the helium/chlorine mixture accelerates to a velocity of about Mach 4.0, the temperature decreases to 50° K., the pressure decreases to approximately 145 torr, and the partial pressure of $Cl_2$ to approximately 13 torr.

After interaction with the liquid BHP stream (atomization and reaction), the flow is decelerated to a lower supersonic flow Mach number, but the pressure increases. Depending upon various factors including the rate of divergence of the reaction chamber walls, there are achieved a Mach number of approximately 3.0, a pressure of 220 torr (partial pressure of oxygen at 20 torr) and a gas temperature increase to 90° K. The temperature increase is mainly due to the heat of the chemical reaction and some quenching of $O_2(^1\Delta)$. The vapor pressure of water at 90° K. is negligible (less than $10^{-3}$ torr). Under these conditions, the flow velocity is approximately 1300 meters per second. Hence, with a reaction chamber about 1 meter long, the residence time is less than 1 millisecond.

In the embodiment shown in FIG. 1 utilizing the coaxially disposed deflecting body, after the gaseous flow is deflected by the deflecting body the flow is reduced to subsonic flow, with a Mach number on the order of 0.5. The temperature rises to about 330° K. and the pressure increases to about 2400 torr (greater than 3 atmospheres). The partial pressure of $O_2(^1\Delta)$ at the laser nozzle is roughly 200 torr. The corresponding yield is about 50%.

If supersonic flow is maintained through the separation means, the partial pressure of the $O_2(^1\Delta)$ goes down to about 43 torr; however, the yield is about 80%.

Obviously, many modifications and variations of the present invention are possible in light of the above teachings. Thus, while the principle, preferred design and mode of operation of the invention have been explained and what is now considered to represent its best embodiment has been illustrated and described, it should be understood that, within the scope of the appended claims, the invention may be practiced otherwise than as specifically described.

What is claimed and desired to be secured by Letters Patent of the United States is:

1. A method for generating singlet delta oxygen comprising the steps of:
   reacting gaseous chlorine with liquid basic hydrogen peroxide (BHP) under supersonic flow conditions to form a flow of liquid droplets and gaseous singlet delta oxygen; and
   separating said flow of liquid droplets and gaseous singlet delta oxygen into a primary flow and a secondary flow, said primary flow containing a major amount of said gaseous singlet delta oxygen and a minor amount of said droplets, said secondary flow containing the remainder of said gaseous singlet delta oxygen and of said liquid droplets.

2. The method of claim 1 wherein the gaseous chlorine is mixed with an inert diluent gas prior to reaction with BHP.

3. The method of claim 1 further including the step of reducing the velocity of said primary flow to a subsonic level prior to its introduction into an optical cavity.

4. The method of claim 1 wheren said supersonic flow conditions are generated by injecting an inert diluent gas and chlorine into a supersonic nozzle at a high pressure.

5. The method of claim 1 wherein said reacting step occurs within a reaction chamber which has a circular cross section and diverging walls, the rate of divergence of said reaction chamber increasing toward its downstream end.

6. The method of claim 5 wherein said separation step includes diverting said major amount of said gaseous singlet delta oxygen through a series of oblique shock waves, a major portion of said liquid droplets being unable to be diverted because of their inertia.

7. The method of claim 6 wherein said major amount of gaseous singlet delta oxygen is diverted by a deflecting body coaxially positioned along the central axis of said reaction chamber within a downstream end of said reaction chamber, said deflecting body having a hollow interior and an upstream deflecting surface for diverting said gaseous singlet delta oxygen into an annular space formed between siad deflecting body and the wall of said reaction chamber.

8. The method of claim 7 wherein said deflecting surface is cone-shaped with an apex facing the upstream direction and wherein the base of said deflecting surface is sufficiently wide so that a major portion of said liquid droplets are unable to pass through said annular space but impinge on said deflecting surface and form a liquid film thereon or impinge on an inner surface of said wall of said reaction chamber and form a liquid film on said wall.

9. The method of claim 8 further comprising the step of coating the inner surface of said wall with an inert substance so as to minimize wall quenching of gaseous singlet delta oxygen.

10. The method of claim 8 wherein said deflecting surface is perforated so as to provide a passageway between said deflecting surface and said hollow chamber for at least a portion of said liquid impinging on said deflecting surface.

11. The method of claim 8 further including the step of collecting the remainder of said liquid impinging on said deflecting surface and directing said remainder of liquid to said hollow chamber.

12. The method of claim 11 further including the step of collecting the liquid formed on the inner surface of said wall of said reaction chamber.

* * * * *

UNITED STATES PATENT AND TRADEMARK OFFICE
CERTIFICATE OF CORRECTION

PATENT NO. : 4,668,498
DATED : May 26, 1987
INVENTOR(S) : James A. Davis

It is certified that error appears in the above-identified patent and that said Letters Patent is hereby corrected as shown below:

On the Title Page:

After "Inventor" add --Assignee: Rockwell International Corporation--

Before "Abstract" add --Attorney, Agent, or Firm - H. Fredrick Hamann; Harry B. Field; Lawrence N. Ginsberg --

Signed and Sealed this

Twenty-eighth Day of June, 1988

Attest:

DONALD J. QUIGG

Attesting Officer

Commissioner of Patents and Trademarks